3,066,037
STARCH PRODUCT AND METHOD OF
MAKING SAME
Richard L. Curtin, Overland, Ernest A. Sowell, St. Louis, and Barrett L. Scallet, Clayton, Mo., assignors to Anheuser-Busch, Incorporated, St. Louis, Mo., a corporation of Missouri
No Drawing. Filed July 2, 1962, Ser. No. 207,108
7 Claims. (Cl. 106—213)

The present invention relates to an improved starch product and to a method of making same. More particularly, the present invention relates to a sprayable liquid laundry starch product and to a method of making said product.

This application contains subject matter in common with our co-pending application Serial No. 794,859, filed February 24, 1959.

Specifically, the present invention relates to a liquid laundry starch composition which has relatively little tendency to absorb moisture from the atmosphere after being applied to a fabric. The liquid laundry starch composition of the present invention also has a long shelf life over a wide temperature range, and is free from corrosive action on any metal objects which may be attached to the starched fabric.

Liquid laundry starches are widely used in the home for starching because of their simplicity and economy of use, that is, they do not require cooking and preparation on the part of the user. In general, the liquid laundry starches avoid the lumpy compositions often prepared in the home and result in a more satisfactory starching operation because they are usually made from specially modified starches, and contain constant quantities of various adjuncts which enhance the ease of ironing and the finished appearance of the fabric.

Commercial liquid laundry starch products are essentially fluid dispersions of cooked starch. Such a colloidal system containing only starch and water is relatively unstable and will separate, thicken or gel to an irreversible and unusable state within a few hours or days. Cooling aggravates this condition. Consequently, to be a suitable article of commerce a liquid laundry starch product must be protected with additives against the adverse effects of prolonged storage over a wide range of temperatures.

In addition to storage life, the effectiveness of a liquid laundry starch product for use in the home depends upon the ease of application, freedom from deleterious action on fabric or equipment, and the quality of finish that it imparts to the starched material.

Furthermore, a liquid laundry starch must not take up water from the atmosphere after it is applied to a fabric. Present liquid laundry starches have a tendency to be hygroscopic, that is, to absorb water from the atmosphere, thus leaving the starched fabric in a limp, damp condition. Since starches are used to give fabrics a stiff, neat appearance, a hygroscopic starch is very undesirable. This is particularly true in areas of high humidity, such as the States which border on the Gulf of Mexico.

It is an object of the present invention to provide a liquid laundry starch which has relatively little tendency to take up water from the atmosphere. A further object is to provide a liquid laundry starch which has no deleterious action on fabric or metal. Another object of the present invention is to provide a liquid laundry starch which has increased stability on prolonged storage over a wide range of temperatures.

More specifically, it is an object of the present invention to provide a liquid laundry starch having included therein a mixture of borax and boric acid in the approximate ratio of about 1.6 parts boric acid to about 1 part borax. A further object is to provide a liquid laundry starch having a mixture of polyethylene glycol esters of fatty acids incorporated therein.

Still another object of the present invention is to provide a sprayable liquid laundry starch containing minor amounts of starch and an ethoxylated castor oil ironing aid.

A further object of the present invention is to provide a novel method of preparing a sprayable liquid laundry starch which will fulfill all of the objects and advantages sought therefor.

These and other objects and advantages will become apparent hereinafter.

The present invention is embodied in a sprayable liquid laundry starch comprising starch, a mixture of boric acid and borax, and an ethoxylated castor oil ironing aid. More particularly, the present invention includes a liquid laundry starch comprising an oxidized starch, a polyethylene glycol ester of a fatty acid, a mixture of boric acid and borax, and a minor amount of an ethoxylated castor oil ironing aid. The present invention also comprises a method of preparing a sprayable liquid laundry starch comprising adding boric acid, borax and a polyethylene glycol ester of a fatty acid to a cooked dispersion of starch to form a concentrate which is added to about twice its volume of water containing an ethoxylated castor oil ironing aid. The invention further consists in the process hereinafter described and claimed and in the sprayable liquid laundry starch made by said process.

A detailed description of the present invention follows:

Present liquid laundry starches contain a variety of additives, such as preservatives, anti set-back agents, coloring agents, perfumes, and ironing aids. These additives produce a variety of starch products, some more effective in one respect than another. In the present invention, a sprayable liquid laundry starch has been produced wherein the novel combinations of ingredients coact to provide a product which is substantially less hygroscopic than starches presently available. The novel ingredients in the present invention include a combination of borax and boric acid in the approximate ratio of about 1.6 parts boric acid to 1 part borax. From about 10% to about 47.5% and preferably 15% to 17.5%, boric acid and borax by weight based on the weight of starch should be used to produce a product having the desired properties.

Certain polyethylene glycol esters of fatty acids are also compounded into the present composition. Preferably, a combination of two different polyethylene glycol esters of fatty acids is used, since such a combination gives definitely superior results. However, a single polyethylene glycol ester of a fatty acid can be used. We prefer to use about 1% of each ester based on the weight of dry starch solids. If more than about 1% of these compounds is used, there are no deleterious effects on the final composition, however, the properties of the final composition are not enhanced by using excess reactant. As little as about 0.5% of a polyethylene glycol ester of a fatty acid can be used and still achieve substantially good results.

Polyethylene glycol esters of fatty acids having a molecular weight of from about 400 to about 1000 are preferably used. Specifically preferred are polyethylene glycol monostearate having a molecular weight of about 1000, and polyethylene glycol monolaurate having a molecular weight of about 400.

In preparing the liquid laundry starch composition of the present invention, it is preferred to use a hypochlorite oxidized corn starch. Although other starches such as wheat starch, potato starch, unmodified corn starch, etc., can be used, the oxidized corn starch produces a superior finish on the starched fabric. The amount of starch used is from about 1.5% to about 5.0% by weight based on the total amount of water. Preferably about 3.3% starch based on the total amount of water is used.

The starch is hydrochlorite oxidized in a manner well known to the starch industry. The degree of hypochlorite oxidation imparted to the starch should fall within the range of about 10 to about 20 Scott. The Scott viscosity test is run at a solids content of about 4%.

Whereas our application Serial No. 794,859 relates to liquid laundry starch compositions which are sold in concentrated form and diluted by the housewife, the present application relates to a liquid laundry starch which is dispensed by a plunger type spray nozzle, or from an aerosol-type container.

The present composition includes at least about 0.5% and preferably about 1% of a suitable preservative, which may be a water soluble phenolic compound such as "Dowicide A" made by Dow Chemical Company, or any other suitable starch preservative. Also, no bluing is used in the present composition.

In addition, the present composition includes an ironing aid which is an ethoxylated castor oil. From about 2–10%, preferably about 8%, by weight based on the weight of dry starch, of the ironing aid is used.

The ethoxylated castor oil ironing aid is necessary because the method of application of the spray starch is different from that used with a liquid laundry starch; it results in a different distribution of the starch on the garment to be ironed. When conventional liquid laundry starch is used, it is diluted and the clothes are dipped into it. The starch is therefore evenly distributed throughout the cloth and has a chance to penetrate the fibers. The instant spray starch, on the other hand, is applied by spraying onto the surface of the cloth, and it is much more likely that localized areas will have relatively large amounts of starch which tends to remain upon the surface rather than penetrating the fibers. Without additional ironing aid, these concentrations of starch stick to the iron and become charred. With sufficient ironing aid of the proper type, a smooth film covers the starch and prevents sticking and charring.

Other substances such as fluorescent whitening agents and perfume can be incorporated in the composition as desired.

The following is an example of a typical formulation prepared according to this invention, and gives a more detailed description of the method in which the sprayable liquid laundry starch product is prepared.

EXAMPLE I

Liquid Laundry Starch Concentrate

| | |
|---|---|
| Water_____grams (g.)____ | 5000.0 |
| Hypochlorite oxidized corn starch_____g____ | 500.0 |
| Boric acid_____g____ | 50.0 |
| Borax (technical grade)_____g____ | 31.2 |
| Polyethylene glycol monostearate (mol. wt. 1000) g____ | 5.0 |
| Polyethylene glycol monolaurate (mol. wt. 400) g____ | 5.0 |
| Fluorescent agent_____g____ | .68 |
| Perfume_____milliliters (ml.)____ | 0.3 |
| Preservative_____g____ | 6.0 |

The oxidized starch is weighed, added to the water, agitated, and cooked with live steam for approximately 30 minutes. After thorough cooking, the pasted starch is cooled to approximately 180° F. At this temperature, the borax and boric acid are added to the starch paste and mixed. Cooling and agitation are continued until a temperature of approximately 160° F. is reached. The two polyethylene glycol esters of fatty acids, polyethylene glycol monostearate and polyethylene glycol monolaurate, are added at this point. Mixing and cooling are continued until the composition reaches a temperature of 120° F. At this temperature, the fluorescent whitening agent, perfume and preservative are added to the composition. If desired, a portion of the water may be withheld at the beginning and added at the completion of the operation in order to control the level of total solids.

The polyethylene glycol esters of fatty acids are added after the starch has been cooked, rather than cooking them with the starch. This method of addition results in a liquid laundry starch product which has better cold stability and better shelf life than products compounded in other ways.

The borax and boric acid also are added after the oxidized starch has been pasted. By so adding these ingredients, the final starch product has less hygroscopicity and better cold stability than products compounded in other ways.

40 g. of an ethoxylated castor oil ironing aid are added to water at a temperature of 100–125° F. and dispersed therein. The amount of water is 10,000 g. or twice the amount of water as is in the liquid starch concentrate.

The liquid starch concentrate and the ironing aid dispersion are mixed with agitation. Agitation is continued while packaging.

The present invention also is embodied in a liquid laundry starch product having from about 1.5% to about 14% starch, water and from about 2% to about 10% of an ethoxylated castor oil ironing aid. This composition also may have included therein the borax-boric acid mixture and the polyethylene glycol esters of fatty acids hereinbefore described.

Thus it is seen that the present invention includes a liquid laundry starch composition that fulfills all of the objects and advantages sought therefor.

This invention is intended to cover all changes and modifications of the example of the invention herein chosen for purposes of the disclosure, which do not constitute departures from the spirit and scope of the invention.

What is claimed is:

1. A sprayable liquid laundry starch composition consisting essentially of a cooked starch dispersion including water and about 1.5% to about 5.0% starch by weight based on the water, at least about 0.5% by weight of dry starch of a polyethylene glycol ester of a fatty acid, from about 10% to about 47.5% by weight based on the weight of dry starch of a mixture of boric acid and borax wherein there are about 1.6 parts boric acid to about 1 part borax, a small but effective portion of a germicide, and from about 2% to about 10% based on the weight of starch of an ethoxylated castor oil ironing aid.

2. The composition set forth in claim 1 wherein said starch is oxidized corn starch.

3. The composition set forth in claim 1 wherein there is 15–17.5% by weight based on the starch of a mixture of boric acid and borax.

4. The composition set forth in claim 3 wherein there is about 2% by weight based on the weight of starch of a mixture of polyethylene glycol esters of fatty acids having a molecular weight of from about 400 to about 1000.

5. A sprayable liquid laundry starch consisting essentially of a cooked starch dispersion including water and about 3.3% starch by weight of the water, about 1% by weight based on the weight of dry starch of a polyethylene glycol ester of stearic acid having a molecular weight of about 1000, about 1% by weight based on the weight of dry starch of a polyethylene glycol ester of lauric acid having a molecular weight of about 400, about 16% by weight based on the weight of dry starch of a mixture of boric acid and borax wherein there are about 1.6 parts boric acid to each 1 part borax, approximately 1% by weight based on the weight of dry starch of a germicide, and about 8% by weight based on the weight of dry starch of an ethoxylated castor oil ironing aid.

6. A method of preparing a sprayable liquid laundry starch including the steps of slurrying an amount of starch equal to a final concentration of about 1.5–5% by weight based on the water in a portion of the water, cooking the starch slurry to gelatinize the starch, cooling the gelatinized starch to about 180° F., adding thereto from about 15–17.5% by weight based on the starch of a mixture of boric acid and borax wherein there are about 1.6 parts boric acid for each part borax, cooling the starch dispersion to about 160° F., adding thereto about 1% by weight based on the dry starch of polyethylene glycol monostearate of molecular weight about 1000 and about 1% by weight based on the dry starch of polyethylene glycol monolaurate of molecular weight about 400, cooling the starch dispersion to about 100–120° F., adding thereto a small but effective portion of a germicide, and diluting the dispersion to its final volume with water having a temperature of about 100–125° F. and containing about 8% by weight based on the weight of dry starch of an ethoxylated castor oil.

7. A liquid laundry starch comprising from about 1.5–14% by weight starch, water, and from about 2 to about 10% by weight based on the starch of an ethoxylated castor oil ironing aid.

References Cited in the file of this patent

UNITED STATES PATENTS

| | | |
|---|---|---|
| 1,786,417 | Alexander | Dec. 30, 1930 |
| 2,174,760 | Schuette | Oct. 3, 1939 |
| 2,581,058 | McCombs | Jan. 1, 1952 |
| 2,732,309 | Kerr | Jan. 24, 1956 |
| 2,938,809 | Katzbeck | May 31, 1960 |

OTHER REFERENCES

Warth: The Chemistry and Technology of Waxes, 2nd edition, Reinhold Pub. Corp., N.Y., 1956, pages 489–90.